United States Patent [19]

Lorimer

[11] Patent Number: 5,334,237
[45] Date of Patent: Aug. 2, 1994

[54] METHOD AND APPARATUS FOR PREDICTING END-OF-LIFE OF A CONSUMABLE IN A FLUID PURIFICATION SYSTEM

[75] Inventor: D'Arcy H. Lorimer, Pismo Beach, Calif.

[73] Assignee: SAES Pure Gas, Inc., San Luis Obispo, Calif.

[21] Appl. No.: 25,376

[22] Filed: Feb. 26, 1993

[51] Int. Cl.[5] .......................................... B01D 53/04
[52] U.S. Cl. .......................................... 95/25; 95/90; 96/108; 55/270; 55/274
[58] Field of Search .............. 55/210, 270, 274; 95/1, 95/23, 25, 90; 96/109, 108

[56] References Cited

U.S. PATENT DOCUMENTS

| | | | |
|---|---|---|---|
| 2,951,156 | 8/1960 | Miller | 95/25 X |
| 3,961,920 | 6/1976 | Gilbert | 55/270 X |
| 4,095,965 | 6/1978 | Neumann et al. | 96/109 |
| 4,133,651 | 1/1979 | Hoy et al. | 55/270 X |
| 4,197,098 | 4/1980 | Stiehl et al. | 55/274 X |
| 5,172,066 | 12/1992 | Succi et al. | 324/693 |

FOREIGN PATENT DOCUMENTS

| | | | |
|---|---|---|---|
| 0438036 | 7/1991 | European Pat. Off. | 55/274 |
| 2718218 | 11/1978 | Fed. Rep. of Germany | 55/274 |
| 3817503 | 11/1989 | Fed. Rep. of Germany | 55/270 |

*Primary Examiner*—Robert Spitzer
*Attorney, Agent, or Firm*—Hickman & Beyer

[57] ABSTRACT

A method for predicting end-of-life of a system consumable in a fluid purification system characterized by the steps of (a) coupling a model consumable to the fluid purification system which has comparable characteristics but substantially less time capacity than the system consumable; (b) diverting a portion of an unpurified fluid which could otherwise flow into the system consumable into the model consumable; and (c) analyzing the model consumable to predict the end-of-life of the system consumable. Preferably, the time capacity of the model consumable to remove impurities from the fluid is a small fraction, e.g. 25%–50%, of the capacity of the system consumable. A fluid purification system of the present invention is characterized by an inlet, an outlet, a system consumable coupled between the inlet and the outlet, a model consumable having comparable characteristics but substantially less time capacity than the system consumable, and a diverting mechanism coupled between the inlet and the model consumable for diverting a portion of an unpurified fluid to model consumable. The diverting mechanism preferably includes a mass flow meter (MFM) coupled in-line with the system consumable which is coupled to and controls a mass flow controller (MFC) which is coupled in-line with the model consumable. The model consumable is analyzed to predict the end-of-life of the system consumable.

34 Claims, 4 Drawing Sheets

METHOD AND APPARATUS FOR PREDICTING END-OF-LIFE OF A CONSUMABLE IN A FLUID PURIFICATION SYSTEM

BACKGROUND OF THE INVENTION

1. Field of the Invention

This invention relates generally to fluid purification systems, and more particularly to gas purification systems used to provide highly purified gasses for use in semiconductor manufacturing equipment.

2. Description of the Related Art

Fluid purification systems are used to remove impurities from contaminated or otherwise impure fluids. The fluids may be liquid and/or gaseous, and are typically purified to provide a high quality fluid source for manufacturing or consumption purposes, or to remove toxins and other contaminants prior to the disposal of the fluid. Such systems usually include "consumables" such as filters or getters, which must be periodically replaced.

In the semiconductor manufacturing industry, gas purifiers are used to provide the highly purified gasses used in the semiconductor manufacturing process. For example, argon (Ar) must have less than 10 parts per billion (ppb) of impurities if it is to be used in-state-of-the-art semiconductor manufacturing equipment. Argon available from commercial gas suppliers typically has about 500 ppb of impurities, including water ($H_2O$), oxygen ($O_2$), nitrogen ($N_2$), carbon monoxide (CO) and carbon dioxide ($CO_22$). Gas purifiers are used to purify the commercially available gas to impurity levels acceptable to the semiconductor manufacturer.

It is apparent from the above example that the terms "pure" and "impure" are relative, not absolute, terms. For example, commercially available argon gas having 500 ppb of impurities can hardly be considered heavily contaminated. Therefore, as used herein, "pure" gasses will be defined as gasses which meet the purity specifications for a given process, and "impure" gasses will be defined as those gasses which do not meet those purity specifications.

There are several methods for removing impurities from gasses such as argon. For example, Semi-Gas of San Jose, Calif. produces a resinous filter under the trademark NANOCHEM which removes impurities from gasses. While resinous filter systems are fairly effective in removing certain impurities from gasses, they sometimes introduce organic contaminants into the gasses being purified.

A preferred type of gas purification system for use in the semiconductor manufacturing industry is a getter-type purification system. Getter materials comprise certain metal alloys which have a chemical affinity for certain gasses. In these systems, getter materials are encased in stainless steel columns and are heated to a temperature in the range of 300°–450° C. Impurities from gasses flowing through a getter column are trapped by the getter materials, thereby providing a purified gas at the outlet of the getter column.

For the most part, the gettering process is not reversible, resulting in the eventual saturation of the getter material with the impurities. Therefore, getter-type materials have a finite "life-time", making the getter columns a "consumable" item. Getter-type gas purification systems are available from SAES Pure Gas of San Luis Obispo, Calif.

FIG. 1 illustrates a commercially available getter-type purification system 10 made by SAES Pure Gas as model MEGATORR. System 10 includes a heated getter column 12, a mass flow meter (MFM) 14, three valves 16, 18, and 20, and end-of-life (EOL) probe 44, and an EOL analyzer 24. An inlet 26 is coupled to a source of impure gas (not shown).

In operation, valves 16 and 18 are opened and the gas to be purified flows through a conduit 28, valve 16, a conduit 30, MFM 14, a conduit 32, getter column 12, a conduit 34, valve 18, a conduit 36 and, finally, out of an outlet 38. The MFM 14 is used to monitor the amount of gas flowing through the system, and the heated getter column 12 removes impurities from the gasses flowing through the system 10.

Valve 20 can be used to bypass the getter column 12. To accomplish the bypass, valves 16 and 18 are closed, and valve 20 is opened. The gas flow is then into inlet 26, through conduit 28, through conduit 40, through valve 20, through conduit 42, through conduit 36 and, finally, out of outlet 38. When the getter column 12 is bypassed in this fashion, there is no purification of the gas flowing through the system 10.

The getter columns 12 contain substantial quantities of expensive getter material and have a finite useful life-time. For example, a 10 $m^3$/hr getter column 12 containing 10 kg of getter material lasts about one year at 10 $m^3$/hr of gas flow with a 5 parts per million (ppm) inlet impurity concentration and costs about $30,000.00 U.S. The actual period of time that the getter column 12 lasts depends upon the type and amount of impurities, the flow rate of the gas, the duration and frequency of the gas flow, and a number of environmental factors.

Because getter columns tend to be expensive, semiconductor manufacturers want to get as much use out of them as possible before they are replaced. Simply relying on a reading from MFM 14 as to when to replace the getter column will often result in discarding a getter column which may only have consumed a fraction of its allotted lifetime. This is because the MFM 14 measures only total gas flow, and is not able to measure impurity concentration. However, semiconductor manufacturers tend to err on the side of conservatism, since using a getter column past its allotted lifetime can result in inadequate gas purification and a possible contamination of a semiconductor manufacturing process utilizing the impure gas, which can be considerably more costly than the cost of replacing a getter column.

A partial solution to this problem is the use of an end-of-life (EOL) sensor 44 disposed within the getter column 12. The getter pellets 46 within the column 12 have a characteristic resistance which increases as their capacity to remove contaminants reduces. This increasing resistance is primarily a function of the amount of oxygen absorbed by the getter pellets 46, resulting in the formation of high resistance oxides. While the primary limiting factor on the life of a noble gas getter column 12 is its absorption of nitrogen, nitrogen absorption is related to oxygen absorption which, as explained previously, is related to the resistance of the getter pellets 46. The EOL analyzer 24 measures the resistance of the getter pellets 46 between EOL sensor 44 and the conductive walls of the getter column 12 to estimate the remaining life in the getter column 12. EOL sensors and analyzers are provided on argon and nitrogen versions of the aforementioned MEGATORR system sold by SAES Puregas, Inc.

While the resistive EOL system comprising sensor 44 and analyzer 24 is a major improvement in predicting the end-of-life of a getter column, it does have some drawbacks. For one, this resistive EOL system is not entirely accurate, because it can only extrapolate nitrogen absorption (the limiting factor for the column) from an estimate of oxygen absorption. Since the proportion of oxygen to nitrogen in the inlet gas can vary, assumptions made about the relationship to oxygen and nitrogen absorption can be erroneous.

Another drawback is that the installation of the resistive EOL sensor into the getter column 12 adds to the cost of the column and increases its fragility. This is because a high temperature, gas-tight seal (such as a ceramic grommet) must be provided through a wall of the getter column 12 to accommodate a connecting wire 48 extending between the EOL sensor 44 and the EOL analyzer 24. If this seal breaks or begins to leak, the getter column may have to be replaced.

The resistive EOL sensor is furthermore currently restricted for use with certain types of gas purification systems. While the EOL sensor works well for argon and nitrogen getter-type gas purification systems, it is not well adapted for use in getter-type gas purification systems which purify hydrogen ($H_2$), ammonia ($NH_3$), or silane ($SiH_4$). There is therefore a need for a method for predicting end-of-life of a system consumable in a fluid purification system which cannot use a resistive EOL sensor.

SUMMARY OF THE INVENTION

The present invention provides an extremely accurate and reliable method and apparatus for predicting the end-of-life of a getter column. This permits semiconductor manufacturers to maximize their use of expensive consumables and to minimize down-time of manufacturing equipment relying upon gasses purified by those consumables, thereby significantly reducing manufacturing costs.

A method in accordance with the present invention includes the steps of coupling a "model" consumable to a fluid purification system having a "system" consumable, diverting a portion of an unpurified fluid from the system consumable to the model consumable, and analyzing the model consumable to predict the end-of-life of the system consumable. The model consumable should be of comparable characteristics to the system consumable, but should have only a fraction of the impurity removal capacity of the system consumable. For example, if the model consumable has 1/5 the capacity of the system consumable, the end-of-life of the system consumable can be accurately predicted as being 5 times the end-of-life of the model consumable.

The model consumable can be analyzed in a number of different ways. A first, highly accurate method for analyzing the model consumable is to remove the model consumable from the purification system and to chemically analyze the contents of the model consumable. Another way to analyze the model consumable is to place a resistive end-of-life (EOL) sensor in the model consumable rather than in the system consumable, as practiced in the prior art. Since the model consumables are much less expensive than the system consumables, a broken or leaking EOL sensor seal on the model consumable will not be as large of an economic loss as a broken or leaking EOL sensor seal on a system consumable. Furthermore, the elimination of the EOL sensor seal from the system consumable removes a potential source of contamination of the gas being purified. A third way to analyze the model consumable is to analyze the purified gas released by the model consumable.

A fluid purification system in accordance with the present invention includes an inlet, an outlet, a system consumable coupled between the inlet and outlet, a model consumable, and a diverting mechanism coupled between the inlet and the model consumable for diverting a portion of the gas flowing into the inlet to the model consumable. The model consumable is of comparable characteristics to the system consumable but has only a fraction of the impurity removal capacity of the system consumable.

The diverting mechanism preferably includes a mass flow meter (MFM) coupled in-line with the system consumable and a mass flow controller (MFC) coupled in-line with the model consumable. By coupling the output of the MFM to the input of the MFC, the amount of diverted gas can be precisely controlled to accurately model the consumption of the system consumable with the model consumable.

A major advantage of this invention is that expensive consumables of a fluid purification system can be used virtually to the end of their potential lives. This not only reduces operating costs of the purification systems, but it can also reduce the down-time of expensive manufacturing equipment relying upon the purified fluids produced supplied by the purification systems.

Another advantage of this invention is that it can be used to predict end-of-life for consumables in many types of liquid and gas purification systems. For example, the present invention can be used to predict EOL of consumables for hydrogen and ammonia purification systems, or for high-purity water purification systems.

These and other advantages of the present invention will become apparent to those skilled in the art upon a reading of the following specification of the invention and a study of the several figures of the drawing.

BRIEF DESCRIPTION OF THE DRAWINGS

FIG. 3a is a detail view of the portion of FIG. 3 encircled by broken line 3a;

FIG. 3b is a graph depicting the relationship between operating time and resistance of getter material in the model consumable illustrated in FIGS. 3 and 3a.

DETAILED DESCRIPTION OF THE PREFERRED EMBODIMENTS

Figure 1:
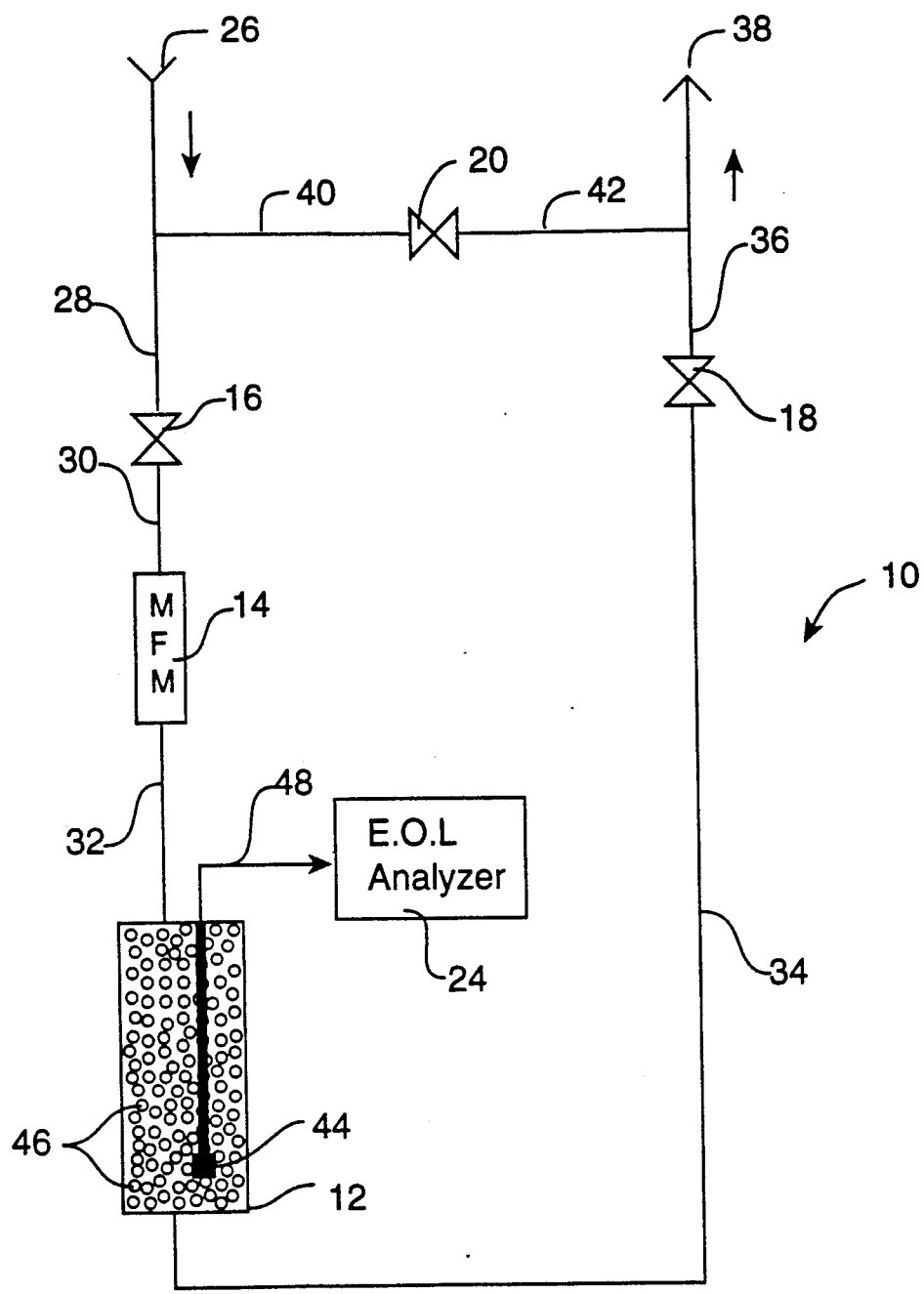
FIG. 1 is a schematic view of a prior art gas purification system.
Figure 2:
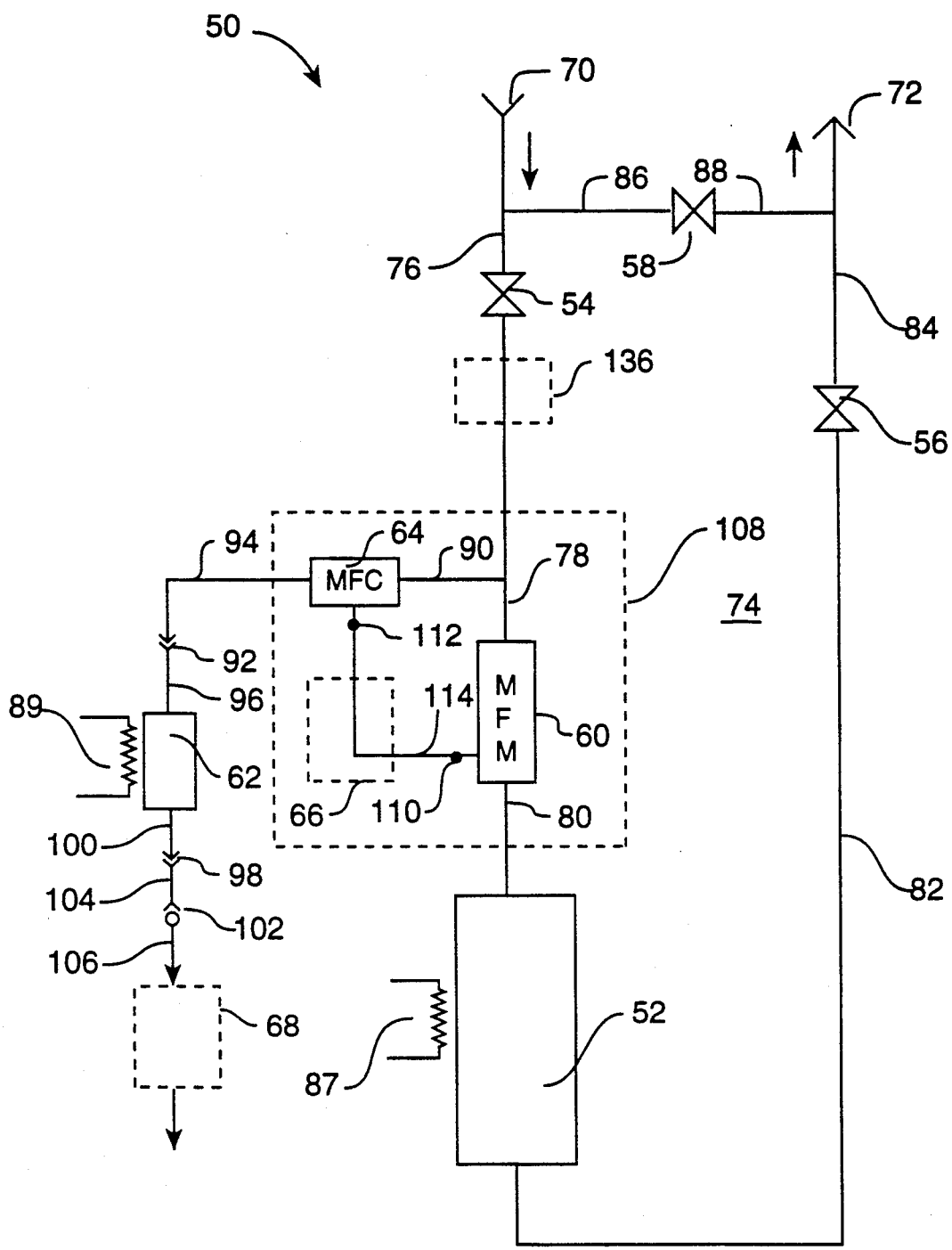
FIG. 2 is a schematic view of a gas purification system in accordance with the present invention.

FIG. 1 illustrates a prior art gas purification system 10. FIG. 2 illustrates a gas purification system 50 in accordance with the present invention.

As seen in FIG. 2, the gas purification system 50 includes a system getter column 52, three valves 54, 56, and 58, a mass flow meter (MFM) 60, a model getter column 62, and a mass flow controller (MFC) 64. The purification system 50 can also optionally include a controller 66 and/or a gas analyzer 68.

The construction of getter columns, such as getter columns 52 and 62, is known. A getter column usually includes a stainless steel shell enclosing getter material which is in either powder or pellet form. As mentioned previously, getter materials comprise metal alloys with an affinity for a particular gas or gasses. Such metal alloys include a 70% Zr, 24.6% V, 5.4% Fe alloy, which has an affinity for most gasses other than noble gasses, and other alloys such as Zr, Fe, V, Al alloys having an affinity for most gasses other than nitrogen and noble gasses. Gettering materials are well known to those skilled in the art.

A source of gas which may have impurities in excess of those required by a semiconductor manufacturing process can be coupled to an inlet 70 of the gas purification system 50. Such gas sources are supplied by commercial gas suppliers, and typically include inert gasses such as argon (Ar) and helium (He), relatively inert gasses such as nitrogen ($N_2$), and reactive gasses such as hydrogen ($H_2$). Semiconductor manufacturing processes typically specify extremely pure gasses where the impurities are measured in parts per billion (ppb). For example, commercial argon gas may have up to 5 parts per million (ppm) of impurities such as oxygen ($O_2$), water vapor ($H_2O$), nitrogen ($N_2$), carbon monoxide (CO) and carbon dioxide ($CO_2$). The gas purification system 50 is designed to remove such impurities to provide a process gas at an outlet 72 which has less than about 1 ppb of impurities.

The main loop 74 of gas purification system 50 includes the system getter column 52, valves 54–58, MFM 60, and a number of conduits 76, 78, 80, 82, 84, 86, and 88. The conduits 76–88 are preferably electropolished stainless steel tubing which is available from a number of sources such as Valex, Inc. of Ventura, Calif. The MFM 60 is a standard mass flow meter such as model No. 558 available from MKS Instruments of Andover, Mass. Valves 54–56 are stainless steel valves such as those available from SAES Pure Gas as part numbers UHP2123, UHP2128, or UHP2131. System getter column 52 is available from SAES Pure Gas as part number PFS-MG20-R. The various conduits and components of main loop 74 are preferably coupled together by standard stainless steel fittings or are securely welded together.

The main loop 74 operates in the same fashion as the gas purification system 10 (FIG. 1) described with reference to the prior art. In operation, valves 54 and 56 are opened and valve 58 is closed. Impure gas flowing into inlet 70 flows through conduit 76, valve 54, MFM 60, conduit 80, system getter column 52, conduit 82, valve 56, conduit 84 and out of outlet 72. The getter material is heated by an electronic feedback-controlled resistance heater 87 to about the same temperature as the main purifier column 52. The hot getter material within system getter column 52 absorbs impurities and preferably reduces the impurities in the gas provided at outlet 72 to below about 1 ppb.

To bypass the main loop 74, such as when there is a failure of the system getter column 52, the valves 54 and 56 are closed, and valve 58 is opened. This permits the gas at inlet 70 to flow through conduit 76, conduit 86, valve 58, conduit 88, conduit 84, and out of outlet 72.

The system getter column 52 can, for example, contain 10 kilograms (kg) of getter material which is designed to last about one year at a 10 $m^3$/hr flow rate when there are 5 ppm of gaseous impurities at the inlet 70 when purifying argon. The column 52 will therefore be referred to as a 10 $m^3$/hr capacity getter column. By "capacity" it is meant herein the capacity to absorb impurities while keeping the gas impurity level at the outlet 72 below a predetermined maximum impurity level.

In contrast, model getter column 62 preferably has a capacity which is a small fraction of the capacity of the system getter column 52. For example, the model getter column 62 might be provided with 250–500 grams of getter material, i.e. 2.5–5% of the amount of getter material provided in the system getter column 52. However, the composition and arrangement of getter material should be similar between the model getter column 62 and the system getter column 52 so that the two column have comparable operating characteristics. By "comparable characteristics" it is meant herein that the columns react comparably to gasses flowing through them and produce roughly the same purified gas composition at their outputs. The model getter column 62 will have comparable characteristics to the system getter column 52 if: 1) the operating temperature of the two columns are about the same; 2) the getter material is of the same composition and form; and 3) the bed geometries (i.e. diameter and length of columns) are appropriately scaled.

As mentioned previously, the model getter column 62 contains 2.5–5% of the amount of getter material contained by the system getter column 52. This amount of getter material allows the model getter column 62 to have comparable characteristics, but less capacity, than the system getter column 52, i.e. the model getter column 62 is a good operational "model" of the system getter column 52. By "capacity", it is meant herein the useful lifetime of a column, which is a function of the amount of getter material in the column, the flow rate of the gas through the column, and the level and type of impurities in the gas. For example, a column with a small amount of getter material with a very small flow rate of gas through it could have a higher capacity than a column with a larger amount of getter material and a higher flow rate of gas. Therefore, "capacity" can also be thought of as "useful life" or as "time capacity."

The capacity of model getter column 62 is determined by the desired frequency of analysis of the column, where the smaller the capacity, the more frequent the analysis. The frequency of analysis is determined, in part, by the amount of advance warning a user desires of the full consumption ("break-through") of the system getter column 52, and how close the user desires to approach the break-through of the system getter column. A higher frequency of analysis allows a more accurate prediction of the end-of-life (EOL) of the getter column. If a user desires considerable forewarning of break-through and a high percentage use of the system getter column, smaller time capacity model getter columns 62 should be used. The cost of frequent replacement and analysis of model getter columns 62 will, of course, be higher than a less frequent schedule of replacement and analysis of higher capacity model getter columns.

The amount of getter material within the model getter column 62 is determined by the amount of material required for a chemical analysis of the material to a desired sensitivity level. For a system getter column 52 with an anticipated 1 year lifetime, the model getter column 62 preferably has a capacity of 3–6 months. For most forms of chemical analysis of the getter material, it is desirable to have at least 100 grams of material available. Therefore, for a model getter column 62 with a 3 month capacity and containing 100 grams of getter material, an average flow rate of 6-7 liters/minute should be provided through the model getter column.

It should be noted that it is preferable that neither the system getter column 52 nor the model getter column 62 be fully consumed, unless some form of on-line monitoring of break-through is employed. In the case of the system getter column 52, full consumption will result in impure gasses being supplied to the manufacturing equipment. If the model getter column 62 is fully consumed, it will be impossible to determine by chemical analysis when its end-of-life had been reached. Therefore, it is preferable that no more than 80-90% of the getter columns be consumed before replacement.

Stainless steel encased getter columns such as system getter column 52 for removing impurities from argon can be purchased from SAES Puregas of San Luis Obispo, Calif. The system getter column 52 is heated by a thermostatically controlled electrical heater 87 to an operating temperature of 350°-400° C. for argon and nitrogen purification. The model getter column 62 is likewise heated by an electrical heater 89.

The gas purification system 50 also preferably includes the mass flow controller (MFC) 64 coupled in-line with the model getter column 62. The MFC 64 is preferably a commercially available MFC which can be purchased from such companies as MKS Instruments of Andover, Mass. The MFC 64 should have sufficient capacity to provide a flow of gas to model getter column 62 models the flow of gas to the system getter column 52. In this preferred embodiment, the MFM 60 is a 0-200 standard-liter/minute (SLPM) mass flow meter, and the MFC 64 is a 0-20 SLPM mass flow controller. As mentioned previously, the average flow of gas through the model getter column 62 is dependent upon the desired capacity of the model getter column.

The MFC 64 is coupled to conduit 78 by a conduit 90 and is coupled to a coupling 92 by a conduit 94. The coupling 92 is coupled to an inlet of the model getter column 62 by a short conduit 96, and an outlet of the model getter column 62 is coupled to a coupling 98 by a short conduit 100. The coupling 98 is coupled to a check-valve 102 by a conduit 104, and the check valve 102 is coupled to the gas analyzer 68 by a conduit 106. The various conduits, couplings, and valves 90-106 are preferably made from electropolished stainless steel available from SAES Pure Gas and others. Couplings 92 and 98 preferably comprise compression metal gaskets, such as those supplied by Cajon Fittings under the trademark VCR metal seals. Couplings 92 and 98 facilitate in the installation and removal of the model getter column 62.

In this preferred embodiment, conduits 78 and 90, MFM 60, and MFC 64 comprise a diverting mechanism 108 for diverting a portion of the impure gas that would otherwise flow into the system getter column 52 into the model getter column. MFM 60 is preferably a 0-200 SLPM device with a corresponding 0-5 volt d.c. analog output 110. Therefore, if there are 0 SLPM of gas flowing through MFM 60, the electrical potential on output 110 will be 0 volts, if there are 200 SLPM of gas flowing through MFM 60, the electrical potential will be 5 volts, and if there are G SLPM of gas flowing through MFM 60, where $0 < G < 200$, then there will be about an electrical potential of G/40 volts at output 110. MFC 64 is preferably a 0-20 SLPM device controlled by an analog voltage in the range of 0-5 volts d.c. applied to an input 112. Therefore, if 0 volts are applied to input 112, 0 SLPM of gas will flow through MFC 64, if 5 volts are applied to input 112, 20 SLPM of gas will flow through MFC 64, and if V volts are applied to input 112, where $0 < V < 5$, then 4 V SLPM of gas will flow through MFC 64.

The d.c. output 110 of MFM 60 may be directly coupled to the d.c input 112 of MFC 64 by a wire 114. In this way, the gas flowing through model getter column 62 will precisely mimic or model the amount of gas flowing through system getter column 52. Alternatively, the output 110 of MFM 60 can be coupled to the input 112 of MFC 64 by a controller 66. The controller 66 may be a simple analog or digital device, but preferably comprises a microprocessor system capable of analyzing the output voltage of MFM 60 and controlling the input voltage to MFC 64. Therefore, the MFC controller 66 preferably includes an analog-to-digital (A/D) converter coupled to the output 110 of the MFM 60, and a digital-to-analog (D/A) converter coupled to the input 112 of MFC 64.

The provision of a microprocessor in the MFC controller 66 adds flexibility to the diverting mechanism 108. For example, any non-linearities on the output 110 of MFM 60 or in the response of MFC 64 to input 112 can be compensated for by software by the microprocessor in the MFC controller 66. Also, there may be times when the MFC 64 should not be slavishly controlled by MFM 60, such as during emergency shut-down situations caused, for example, by a failure of the system getter column 52.

The illustrated embodiment for diverting mechanism 108 is preferable because it allows a very accurate control of the gas flow and, therefore, very accurate modeling of the system getter column 52 by the model getter column 62. However, the diverting mechanism 108 can be replaced with other mechanisms which can accomplish a similar result. For example, the diverting mechanism 108 can be replaced with a simple pneumatic splitter which would divert a fractional amount of the impure gas to the model getter column 62.

The model getter column 62 can be analyzed in several ways to predict the end-of-life of the system getter column 52. A first method for analyzing the model consumable 62 is to physically remove the model getter column 62 from the gas purification system 50 and then to chemically analyze the model getter column 62 to determine its impurity content. The removal of the model getter column 62 is facilitated by the VCR metal seal couplings 92 and 98. After the model getter column 62 is removed, a replacement model getter column is inserted into the system 50 to continue modeling the consumption of the system getter column 52.

The chemical analysis of the removed model getter column 62 typically results in the destruction of the column. The casing of the column 62 is breached and the getter material is removed for destructive chemical analysis. Since the model getter column 62 is an accurate model of the system getter column 52, the nitrogen or other impurity content of the system getter column can be very accurately predicted by the nitrogen or other impurity content of the model getter column. Since the nitrogen absorption capacity of the system getter column is known, knowledge of the nitrogen content of the model getter column 62 allows very precise prediction of the remaining life in the system getter column 52.

The predicted lifetime of the model getter column 62 can be selected to be less than, equal to, or greater than the predicted lifetime of the system getter column 52 by selecting the amount, type, and configuration of the getter material and the relative rate of gas flow through the model getter column. Preferably, the predicted lifetime of the model getter column is less than, e.g. 25%–50% of, the predicted lifetime of the system getter column. This reduces waste by providing a more complete consumption of the model getter column 62 before the destructive chemical analysis.

A second method for analyzing the model getter column 62 is to analyze the gasses released from the output conduit 100 of the model getter column. A check-valve 102 is used to prevent back-flow of gasses into the model getter column 62. A gas analyzer 68 can detect a variety of trace gasses, but preferably can detect trace amounts of nitrogen carried in an inert gas such as argon. A suitable analyzer 68, such as a gas chromatograph with a helium detector, can be obtained from Varian Corporation of Palo Alto, Calif. When the trace amount of nitrogen exceeds a known level, it can be assumed that the end-of-life of the model getter column 62 has arrived, and the remaining life of the system getter column 62 can therefore be accurately predicted. For example, if the model getter column is designed to have ¼ of the lifetime of the system getter column, it can be assumed that for each model getter column 62 that is consumed that another ¼ of the system getter column has been consumed.

Figure 3:
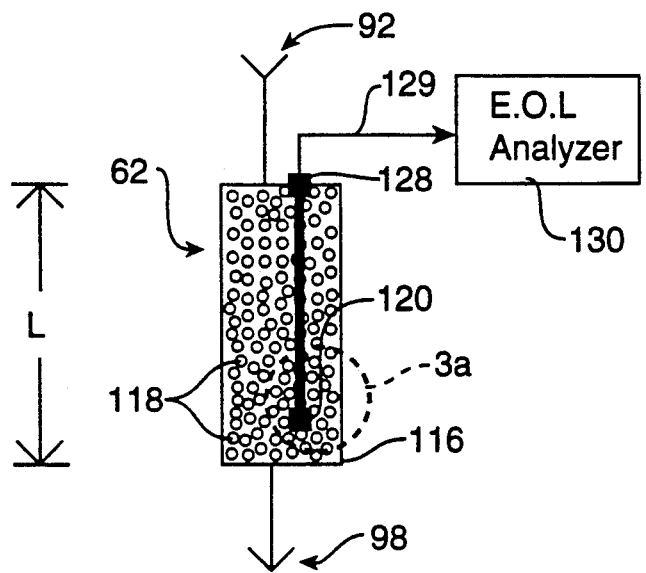
FIG. 3 is a detail view of a model consumable with a resistive end-of-life (EOL) detection system in accordance with the present invention.
Figure 3A:
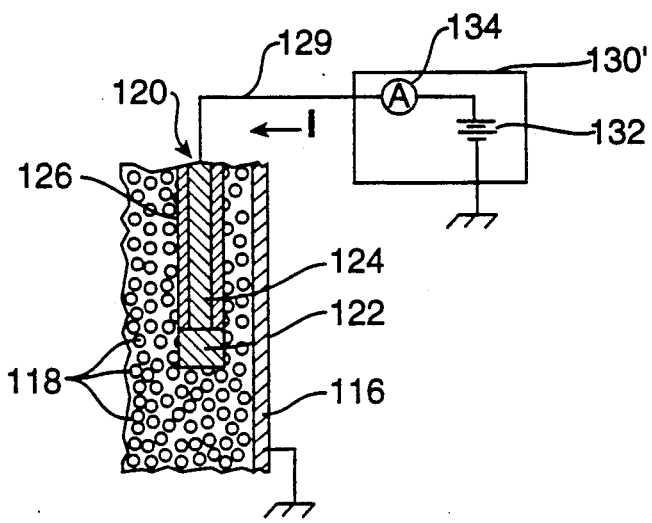
Figure 3B:
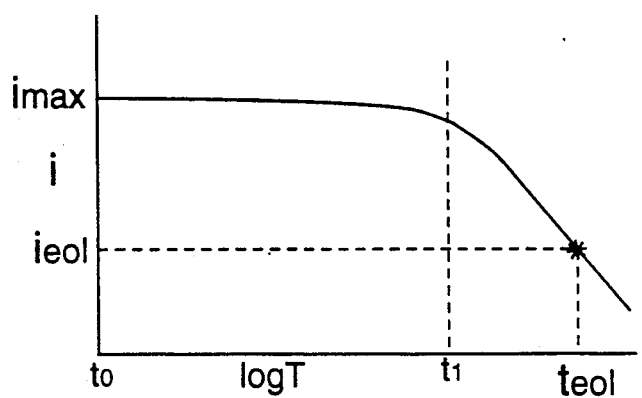

A third method for analyzing the model getter column 62 is illustrated in FIGS. 3, 3a, and 3b. As previously described, model getter column 62 includes a stainless steel shell 116 filled with getter material 118. The getter material is preferably in the form of small, compressed pellets. An end-of-life (EOL) sensor assembly 120 includes a conductive probe 122, an electrical conductor 124, an insulating sheath 126, and an insulating, sealing grommet 128 which permits the electrical conductor 124 to pass through the stainless steel shell 116 without electrically shorting to the shell. The conductive probe 122 is preferably made from 316-SS wire and the electrical conductor 124 is also preferably made from the same material. The insulating sheath 126 and sealing grommet 128 are preferably made from a dense ceramic material such as alumina. A disclosure of the above-described EOL sensor is found in U.S. Pat. No. 5,172,066 issued Dec. 15, 1992, filed as U.S. Ser. No. 07/665,977 on Mar. 7, 1991 on behalf of Solcia et al., entitled "A Method for Determining the End of Useful Life of a Gas Purifier and Apparatus Therefor", and assigned in common with the assignee of the present invention, the disclosure of which is incorporated herein by reference in its entirety.

As seen in FIG. 3, the EOL sensor assembly 120 is coupled by a conductive line 129 to an end-of-life (EOL) analyzer 130 which senses a change in resistance of the getter material 118 to predict the end-of-life of the model getter column 62. As seen in FIG. 3a, an EOL analyzer 130' can be as simple as an ohm-meter comprising a d.c. power source 132 and a d.c. ammeter 134. As the resistance of the getter material 118 changes due to use of the model getter column 62, the current i flowing from power source 132, through ammeter 134, through line 129, through conductor 124, through probe 122, through the getter material 118 and through the conductive shell 116 to ground will decrease. By the well-known Ohms law, the current i will be given by V/R, where V is the voltage of power source 132, and R is the resistance of the current path. Since the line 129, conductor 124, probe 122, shell 116, and ground path have minimal resistance, R is approximately equal to the resistance of the getter material 118 to the current flowing between probe 122 and shell 116.

The relationship between the current i flowing through the getter material 118 and the use of model getter column 62 is illustrated in FIG. 3b. The x axis is calibrated in units of the logarithm of time (log T) and the y axis is calibrated in units of current (i). At a time $t_0$, the current i is at a maximum value $i_{max}$. The current i remains fairly stable at $i=i_{max}$ until a time $t_1$ when the resistance R of the getter material 118 begins to measurably increase due, primarily, to the absorption of oxygen by the getter pellets. As the resistance R increases, the current i decreases until it reaches a current $i_{eol}$ at a time $t_{eol}$. At this point in time, the model getter column 62 has reached its end-of-life.

Figure 4:
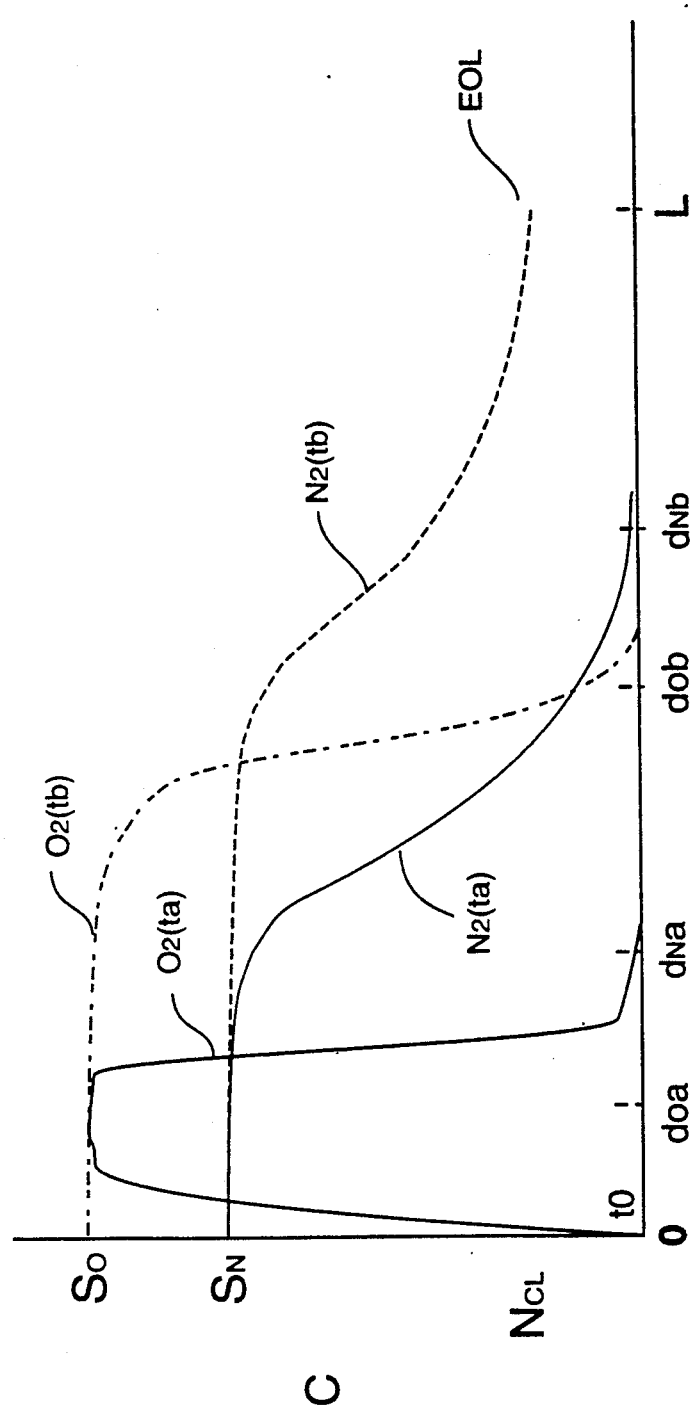
FIG. 4 is a graph depicting the saturation of a getter column along its length L with oxygen and nitrogen at three times $t_0$, $t_1$, and $t_2$.

FIG. 4 illustrates the concentration of oxygen and nitrogen in a noble gas model getter column 62 along its length L at various times $t_0$, $t_a$, and $t_b$. The x axis is calibrated in units of distance of the getter material 118 from the inlet of the model getter column 62. The y axis is calibrated in units of the concentration of impurities in the getter material 118 at various distances from the inlet of the model getter column 62.

At time $t_0$, the concentration of oxygen ($O_2$) and nitrogen ($N_2$) in the getter material 118 is nearly zero since no gas has yet flowed through the model getter column 62. As soon as impure gas begins to flow through the model getter column, the getter material immediately adjacent to the inlet becomes saturated with oxygen and nitrogen as indicated at $S_O$ and $S_N$ on the y axis. However, getter material farther from the inlet still has the capacity to absorb $O_2$ and $N_2$. At a time $T_a$, the getter pellets are saturated with $O_2$ for a distance $d_{oa}$ from the inlet, and the getter pellets are saturated with $N_2$ for a distance $d_{na}$ from the inlet to the model getter column. At a time $T_b$, the getter pellets are saturated with $O_2$ for a distance $d_{ob}$ from the inlet, and the getter pellets are saturated with $N_2$ for a distance $d_{nb}$ from the inlet.

As can be seen in FIG. 4, there is a correlation between the oxygen concentration in the getter material and the nitrogen concentration in the getter material. It is the nitrogen concentration which is the limiting factor in the life of both the model getter column and the system getter column. However, it is the oxygen concentration that is measured by the apparatus in FIG. 3, because oxygen concentration is directly related to the resistivity of the getter material 118.

If the lifetime of the model getter column 62 is about $t_b$, the probe 122 is preferably placed approximately $d_{ob}$ from the inlet. As seen in the nitrogen curve $N_2(t_b)$ in FIG. 4, this results in nitrogen concentration of about $N_{cl}$ in the getter material at the outlet of the model getter column 62 at time $t_b$. While the getter material within the model getter column 62 has not been fully saturated at this point, its capacity to absorb nitrogen is declining, and the end-of-life (EOL) of the model getter column 62 is called. As explained previously, the EOL of the model getter column 62 can be used to predict the EOL of the system getter column 52. An even more accurate prediction of the EOL of the system getter column 52 can be made if a chemical analysis of the getter material in the model getter column 62 is made after the end-of-life of the model getter column 62 is called.

The gas purification systems described previously are used to purify inert and semi-inert gasses. With minor modifications, the system can also be used to purify reactive gasses such as hydrogen ($H_2$). To provide a hydrogen purification system in accordance with the present invention, the apparatus of FIG. 2 is modified in several ways. Firstly, the system getter column 52 and the model getter column 62 are filled with an alloy such as ST 717 produced by SAES Getters, SPA which removes impurities from hydrogen flowing through the column. Secondly, the columns 52 and 62 are operated at a much higher temperature, e.g., approximately 550°–600° C. Thirdly, a pre-purification block 136 is inserted in-line with conduit 78 to remove CO and $CO_2$ from the gas. If the CO and $CO_2$ were to be left in the hydrogen gas, they would be converted to methane in the getter columns, thereby introducing a new contaminant to the gas. A pre-purification block such as pre-purification block 136 is made by SAES Pure Gas of San Luis Obispo, Calif., and is described in U.S. patent application Ser. No. 07/825,096, filed Jul. 2, 1992, on behalf of Succi et al., and assigned to the assignee of the present invention, the disclosure of which is hereby incorporated by reference in its entirety. Otherwise, the hydrogen purification system and its operation is essentially the same as the previously described inert and semi-inert gas purification systems.

While this invention has been described in terms of several preferred embodiments, it is contemplated that alterations, modifications, permutations and equivalents thereof will become apparent to those skilled in the art upon a reading of the specification and study of the drawings. For example, while this invention has been described in terms of a gas purification unit, equivalent methods and apparatus can be used to predict the end-of-life of consumables in liquid purification systems. Furthermore, certain terminology has been used for the purposes of descriptive clarity, and not to limit the present invention.

It is therefore intended that the following appended claims include all such alterations, modifications, permutations and equivalents as fall within the true spirit and scope of the present invention.

What is claimed is:

1. A method for predicting the end-of-life of a system consumable in a system for purifying an unpurified fluid, the method comprising the steps of:
    coupling a model consumable to a fluid purification system which has comparable characteristics but substantially less capacity than a system consumable in said fluid purification system;
    diverting a portion of the unpurified fluid which could otherwise flow into said system consumable into said model consumable, the mass flow rate of the diverted portion being controlled by a mass flow controller; and
    analyzing said model consumable to predict the end-of-life of said system consumable.

2. A method for predicting end-of-life of a system consumable in a fluid purification system as recited in claim 1 wherein said fluid purification system comprises a gas purification system, and wherein said system consumable and said model consumable comprise getter material.

3. A method for predicting end-of-life of a system consumable in a fluid purification system as recited in claim 1 wherein said step of diverting a portion of an unpurified fluid comprises diverting a portion of unpurified fluid into said model consumable which is quantitatively related to the flow of unpurified fluid into said system consumable.

4. A method for predicting end-of-life of a system consumable in a fluid purification system as recited in claim 1 wherein said step of analyzing said model consumable comprises removing said model consumable from said fluid purification system and analyzing said model consumable.

5. A method for predicting end-of-life of a system consumable in a fluid purification system as recited in claim 4 further comprising replacing said removed model consumable with a replacement model consumable.

6. A method for predicting end-of-life of a system consumable in a fluid purification system as recited in claim 4 wherein said removed model consumable is analyzed by a destructive chemical analysis.

7. A method for predicting end-of-life of a system consumable in a fluid purification system as recited in claim 1 wherein said step of analyzing said model consumable comprises monitoring the resistance of consumable material within said model consumable.

8. A method for predicting end-of-life of a system consumable in a fluid purification system as recited in claim 1 wherein said step of analyzing said model consumable comprises monitoring fluid flowing out of said model consumable.

9. A method for predicting the end-of-life of a system consumable held in a system column of a system for purifying an unpurified fluid, the method comprising the steps of:
    coupling a model consumable in a model column to a fluid purification system, the model consumable having comparable characteristics but substantially less capacity than a system consumable in said fluid purification system, the model column having substantially the same geometry as the system column and having a diameter and length scaled with those of the system column;
    diverting a portion of the unpurified fluid which could otherwise flow into said system consumable into said model consumable; and
    analyzing said model consumable to predict the end-of-life of said system consumable.

10. A method for predicting end-of-life of a system consumable as recited in claim 9 wherein said fluid purification system comprises a gas purification system, and wherein said system consumable and said model consumable comprise getter material.

11. A method for predicting end-of-life of a system consumable as recited in claim 9 wherein said step of analyzing said model consumable comprises removing said model consumable from said fluid purification system and analyzing said model consumable.

12. A method for predicting end-of-life of a system consumable as recited in claim 9 wherein said step of analyzing said model consumable comprises monitoring the resistance of consumable material within said model consumable.

13. A method for predicting end-of-life of a system consumable as recited in claim 9 wherein said step of analyzing said model consumable comprises monitoring fluid flowing out of said model consumable.

14. A method for monitoring a getter purification system comprising the steps of:
    coupling an inlet of a system getter column to a source of unpurified gas, said system getter column containing a first quantity of getter material;

coupling an inlet of a model getter column to said source of unpurified gas in parallel with said system getter column, said model getter column containing a second quantity of getter material which is substantially less in quantity than said first quantity of getter material within said system getter column;

heating said first quantity of getter material within said system getter column with a first heater to a system getter operating temperature which is substantially greater than room temperature;

heating said second quantity of getter material within said model getter column with a second heater to a model getter operating temperature which is substantially greater than room temperature;

flowing unpurified gas into said system getter column having said heated first quantity of getter material and into said model getter column having said heated second quantity of getter material such that substantially more unpurified gas flows into said system getter column than said model getter column; and analyzing said second quantity of getter material within said model getter column to predict an end-of-life of said first quantity of getter material with said system getter column.

15. A method for monitoring a getter purification system as recited in claim 14 wherein said step of flowing unpurified gas includes a step of passing the gas through a mass flow controller coupled between said inlet of the system getter column to said source of unpurified gas.

16. A method for monitoring a getter purification system as recited in claim 14 wherein said step of flowing unpurified gas includes a step of passing the gas through a mass flow controller coupled between said inlet of the model getter column to said source of unpurified gas.

17. A fluid purification system comprising:
an inlet adapted to be coupled to a source of unpurified fluid;
an outlet;
a system consumable coupled between said inlet and said outlet such that unpurified fluid flowing through said system consumable is purified by said system consumable;
a model consumable having comparable characteristics but substantially less capacity than said system consumable; and
diverting means coupled between said inlet and said model consumable for diverting a portion of said unpurified fluid which could otherwise flow through said system consumable into said model consumable, wherein said means for diverting a portion of said unpurified fluid further comprises a mass flow controller (MFC) coupled between said inlet and said model consumable.

18. A fluid purification system as recited in claim 17 wherein said means for diverting a portion of said unpurified fluid further comprises a mass flow meter (MFM) coupled between said inlet and said system consumable.

19. A fluid purification system as recited in claim 18 wherein said MFM is coupled to said MFC such that the rate of flow of unpurified fluid into said model consumable is controlled by the rate of flow of unpurified fluid into said system consumable.

20. A fluid purification system as recited in claim 19 wherein said MFM is coupled to said MFC by an apparatus employing digital logic.

21. A fluid purification system as recited in claim 17 further comprising coupling means for releasably coupling said model consumable to said diverting means.

22. A fluid purification system as recited in claim 17 further comprising fluid analysis means coupled to an outlet of said model consumable for detecting impurity levels in fluids exiting said model consumable.

23. A fluid purification system as recited in claim 17 further comprising end-of-life detection means adapted to measure the resistance of said model consumable, wherein said model consumable comprises getter material.

24. A fluid purification system as recited in claim 17 wherein said model consumable has a time capacity to remove impurities from said fluid which is less than or equal to about 50% of the time capacity to remove impurities of said system consumable.

25. A fluid purification system as recited in claim 24 wherein said model consumable has a time capacity to remove impurities from said fluid which is less than or equal to about 25% of the time capacity to remove impurities of said system consumable.

26. A fluid purification system comprising:
an inlet adapted to be coupled to a source of unpurified fluid;
an outlet;
a system consumable held in a system column coupled between said inlet and said outlet such that unpurified fluid flowing through said system consumable is purified by said system consumable;
a model consumable held in a model column having substantially the same geometry as the system column and having a length and diameter scaled with those of the system column, the model consumable having comparable characteristics but substantially less capacity than said system consumable; and
diverting means coupled between said inlet and said model consumable for diverting a portion of said unpurified fluid which could otherwise flow through said system consumable into said model consumable.

27. A fluid purification system as recited in claim 26 wherein said system consumable and said model consumable comprise getter material, and wherein said unpurified fluid comprises a mixture of gasses.

28. A fluid purification system as recited in claim 27 further comprising end-of-life detection means adapted to measure the resistance of getter material within said model consumable.

29. A fluid purification system as recited in claim 26 wherein said means for diverting a portion of said unpurified fluid further comprises a mass flow controller (MFC) coupled between said inlet and said model consumable, a mass flow meter (MFM) coupled between said inlet and said system consumable, wherein said MFM is coupled to said MFC such that the rate of flow of unpurified fluid into said model consumable is controlled by the rate of flow of unpurified fluid into said system consumable.

30. A getter purification system comprising:
a system getter column coupled to a source of unpurified gas, said system getter column containing a first quantity of getter material;
a model getter column containing a second quantity of getter material which is substantially less in quantity than said first quantity of getter material within said system getter column;

coupling means coupling said model getter column to said source of unpurified gas such that substantially less gas flows into said model getter column than said system getter column;

a first heater coupled to said system getter column to heat said first quantity of getter material to a system getter operating temperature which is substantially greater than room temperature;

a second heater coupled to said model getter column to heat said second quantity of getter material to a model getter operating temperature which is substantially greater than room temperature;

analyzing means for analyzing said second quantity of getter material within said model getter column to predict an end-of-life of said first quantity of getter material with said system getter column.

31. A getter purification system as recited in claim 30 wherein said coupling means comprises a mass flow controller coupled between said source of unpurified gas and said model getter column.

32. A getter purification system as recited in claims 31 wherein said coupling means comprises a mass flow meter coupled between said source of unpurified gas and said system getter column.

33. A getter purification system as recited in claim 30 wherein said model getter column has a length and diameter scaled with those of the system getter column.

34. A getter purification system as recited in claim 30 wherein the operating temperatures of said system and model getter columns are held at about the same value by said first and second heaters.

* * * * *